May 17, 1949.  E. C. MOSS  2,470,635
GAUGE FOR CHECKING THE POSITIONS OF PARTS MOUNTED
ON THE INNER PERIPHERIES OF CYLINDRICAL ARTICLES
Filed July 10, 1946  2 Sheets-Sheet 1
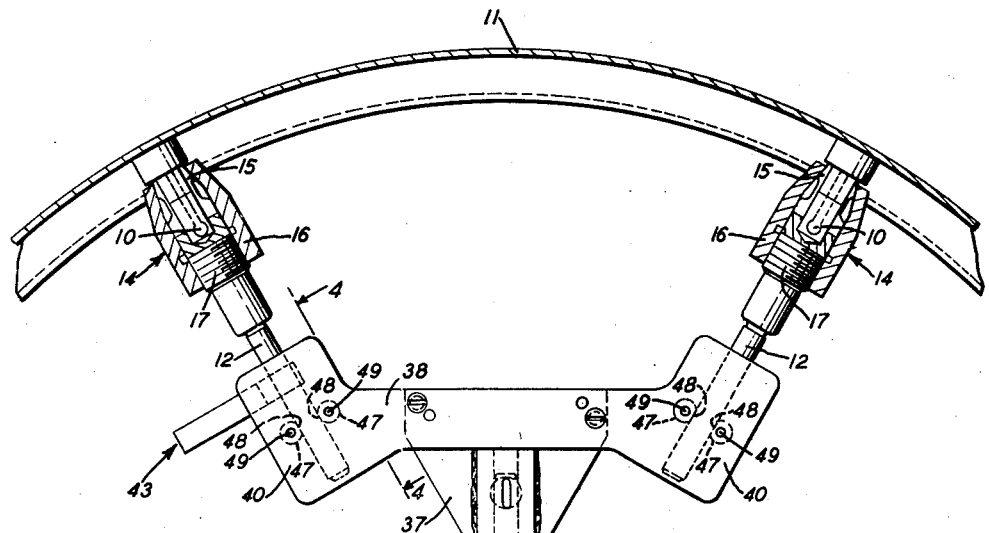
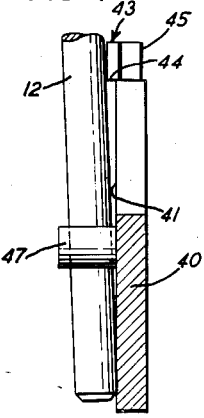
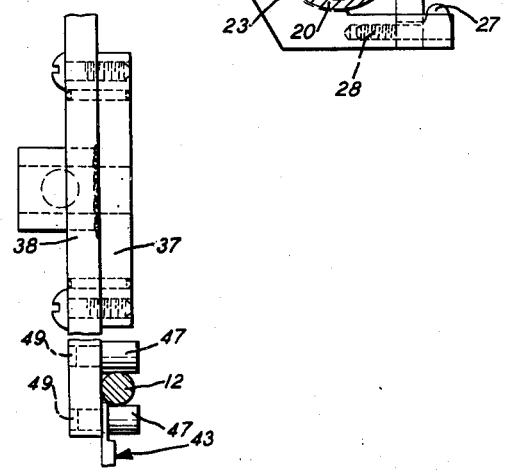
INVENTOR
E. C. MOSS
BY
W. C. Parnell
ATTORNEY May 17, 1949.  E. C. MOSS  2,470,635
GAUGE FOR CHECKING THE POSITIONS OF PARTS MOUNTED
ON THE INNER PERIPHERIES OF CYLINDRICAL ARTICLES
Filed July 10, 1946  2 Sheets-Sheet 2

INVENTOR
E.C. MOSS
BY
W.C. Parnell
ATTORNEY

Patented May 17, 1949

2,470,635

UNITED STATES PATENT OFFICE 2,470,635

GAUGE FOR CHECKING THE POSITIONS OF PARTS MOUNTED ON THE INNER PERIPHERIES OF CYLINDRICAL ARTICLES

Earl C. Moss, Westfield, N. J., assignor to Western Electric Company, Incorporated, New York, N. Y., a corporation of New York Application July 10, 1946, Serial No. 682,674

4 Claims. (Cl. 33—180)

1

This invention relates to gages and more particularly to gages for checking the positions of parts mounted on the inner peripheries of cylindrical articles with respect to given positions radially of the centerlines of the articles.

In the manufacture of various kinds of apparatus and equipment, it is necessary to check the alignment or relationship of various parts with respect to given positions to a high degree of accuracy. When the parts are to function efficiently with units subsequently assembled within the cylindrical article, the mounting of these parts within predetermined limits of given positions is important.

An object of the invention is to provide a gage which is simple in structure and highly efficient for checking the position of a part mounted on the inner periphery of a cylindrical article with respect to a given radial position from the centerline of the article.

Owing to the fact that the part being gaged is not of sufficient size or length to accurately check its position with respect to the centerline of the cylindrical article in which it is mounted, a bar is secured to the part by a chuck, the chuck assuring accurate alignment of the bar with the part. A support in the form of a shaft is mounted with its centerline coinciding with the centerline of the article. An arm is movable in a guided path on the support relative to the bar and has a gaging surface, lying in a plane parallel with a reference plane of the part in the given position desired for the part, to engage the bar. Means in the form of a measuring element cooperates with the gaging surface and the bar when the surface is moved into engagement with the bar to indicate whether or not the part is within predetermined limits of the said given position. Other gaging features include spaced gaging members carried by the arm at the gaging surface to receive the bar therebetween if the part is within predetermined limits of the said given position.

Other objects and advantages will be apparent from the following detailed description when considered in conjunction with the accompanying drawings, wherein Fig. 1 is a front elevational view of the gage in position to check spaced parts of an article;

Fig. 3 is a fragmentary sectional view taken along the line 3—3 of Fig. 2; and

Fig. 4 is an enlarged fragmentary sectional view taken along the line 4—4 of Fig. 1.

2

Figure 2:
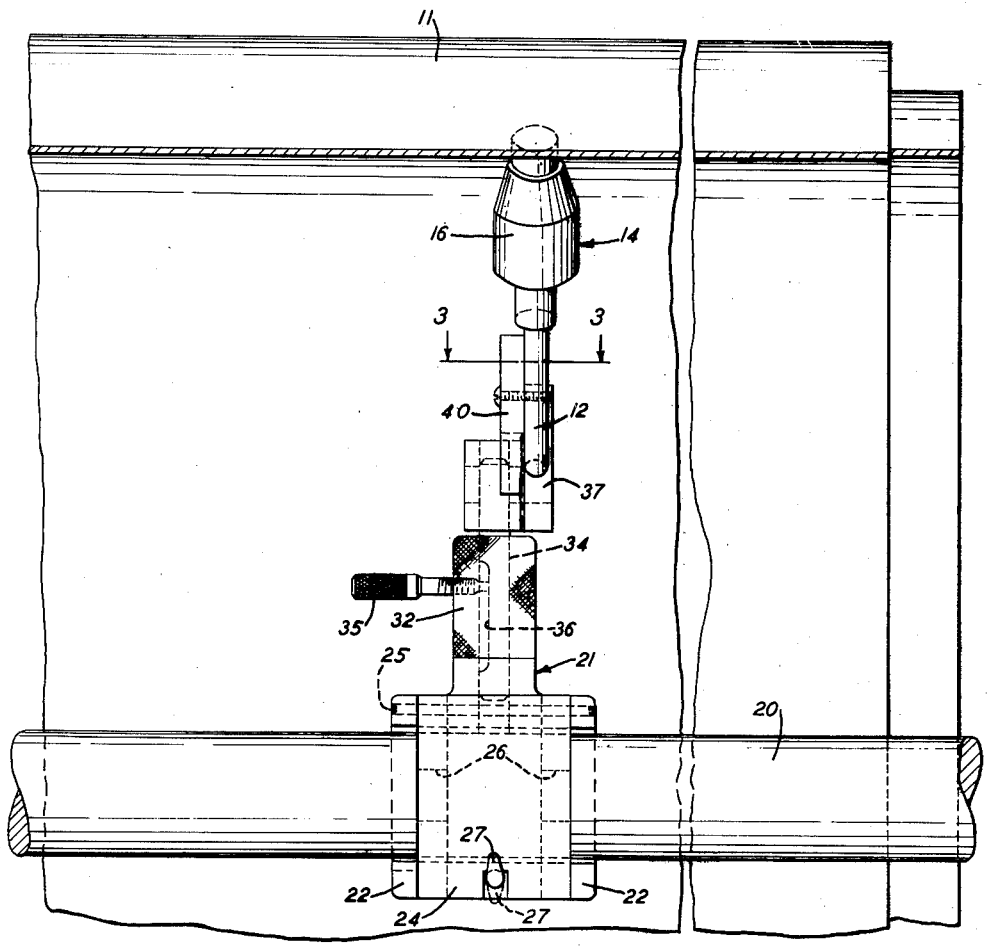
Fig. 2 is a side elevational view of a structure shown in Fig. 1.

In the present embodiment the structure being gaged includes like parts 10 mounted at selected positions on the inner periphery of a cylindrical article 11. The parts 10 are not of sufficient size to accurately determine their locations with respect to given positions extending at predetermined limits radially from the centerline of the article 11. For this reason bars 12 are secured to the parts 10 through the aid of chucks 14. The chucks 14 have resilient jaws 15 which are closed uniformly on the parts 10 as the chuck is closed through rotation of the outer shell 16 on the threaded portion 17 of the bar 12. With this structure, the bars act as extensions for the parts 10.

A support 20 in the form of a shaft is mounted by suitable means (not shown) so that its centerline coincides with the centerline of the article 11. A slide or carriage 21 having a U-shaped portion 22 with a concaved recess 23, partially conforming to the support 20, is removably disposed on the support. A gate 24, hinged at 25 to one leg of the member 22 and having concaved recesses 26 near its center to partially conform to the support 20, is held in closed position by a latch 27. The latch 27 has a threaded shank 28 receivable in a threaded aperture of the lower leg of the member 22 while the head of the latch, when in the upper position holds the gate in closed position, the latch freeing the gate when in the dotted position shown in Fig. 2.

The slide 21 is guided in its movement on the support, as it advances toward the parts 10 and 11, by a projection 30 carried by the support 20 receivable in a longitudinally extending slot 31 in the slide.

A sleeve 32 integral with the member 22 of the slide receives a pin 34 held in a selected position by a screw 35, carried by the sleeve and having its reduced inner end receivable in a longitudinal groove 36 of the pin 34. A bracket 37 is mounted upon the upper end of the pin and a gage arm 38 is fixed to the bracket 37. The arm 38 has portions 40 with gaging surfaces 41 which lie in like planes parallel with the given positions or planes wherein the centerlines of the parts 10 are expected to be positioned. If the parts 10 are accurately mounted in the positions specified, the cylindrical bars 12 being in alignment with the parts and acting as true extensions of the parts would be engaged for the major portions of their lengths by both gaging surfaces 41 upon movement of the arm with the slide into the gaging position.

In the present embodiment certain tolerances, that is, variations in the mounting of the parts with respect to the said given radial positions are permissible. To determine whether or not the parts are within the given limits, an element 43 having a handle 45 and a gaging portion 44 may be directed toward any space existing between the bar 12 and the gaging surface 41. If the part 10 and its respective bar 12 extend at an angle with respect to the gaging surface 41 and with respect to the said given position, one point of the bar will engage its surface 41, the other portions of the bar extending away from the surface in the angle the part 10 varies from the given radial position. The gaging portion 44 of the element 43 is machined to a given thickness immediately greater than the distance allowed between the bar 12 and the surface 41. If the gaging portion 44 of the element 43 is receivable between the bar 12 and its gaging surface 41 at any of the spaced positions from the contact point, the part is not within given limits in this one gaging feature.

With the structure thus far described, approximately half of the check has been made to determine the positions of the parts 10. To complete gaging of the parts, gaging members 47, in the form of hardened sleeves with flattened surfaces 48 parallel with each other, are mounted upon the portions 40 of the arm by pins 49 in positions perpendicular to the gaging surfaces 41. The surfaces 48 of the gaging members are spaced distances slightly greater than the diameters of the bars 12 to receive the bars between their respective gaging members if the positions of the bars are within predetermined limits of the said given positions. This completes the gage.

During gaging of the parts, the bars 12 are secured to their respective parts 10 while the slide 21 with its associated structure is positioned at an out-of-the-way location. After the chucks 14 are closed tightly on the parts 10, the slide 21 may be moved into a position, where it is guided by the projection 30 receivable in the notch 31, and moved until it is stopped by the bars 12. If the bars fail to enter the space between the surfaces 48 of the gaging members 47, the operator is assured that the parts are not mounted within the given limits required in a direction circumferentially of the cylinder. The bars may enter the gaging position between the members, and if the bars 12 engage the gaging surfaces 41 throughout the major portions of their lengths, the operator is assured that the parts 10 are within the desired positions. It is possible, however, that the bars controlled by the parts are disposed at angles with respect to their gaging surfaces 41. In one instance, the bar may engage the top edge of its gaging surface, while the other bar may engage the gaging surface near its lower end. In either instance, the gaging element 43 is employed in cooperation with the bars 12 and their gaging surfaces to indicate whether or not the angular positions of the bars 12 and parts 10 are within limits required from the said given positions in a direction axially of the cylinder.

If either one of the parts being gaged should prove to be in a defective position, in either direction, as determined by the gaging members 47 or gaging surface 41 and element 43, suitable means may be provided to correct this part and through the aid of its chuck and bar it may be gaged a second time to determine whether or not its position has been corrected.

Although specific improvements of the invention have been shown and described, it will be understood that they are but illustrative and that various modifications may be made therein without departing from the scope and spirit of this invention as defined by the appended claims.

What is claimed is:

1. A gage for checking the position of a part, mounted on the inner periphery of a cylindrical article, with respect to a given line radially of the centerline of the article, the gage comprising a bar, a chuck supporting the bar and actuable for mounting on the part and securing the bar in alignment with the part, a support mountable with its centerline coinciding with the centerline of the article, a carriage movable in a guided path on the support relative to the bar, an arm supported by the carriage and movable therewith in the guided path, and spaced gaging members carried by the arm to receive the bar therebetween if the part is within predetermined limits of the said given radial line.

2. A gage for checking the position of a part, mounted on the inner periphery of a cylindrical article, with respect to a given line radially of the centerline of the article, the gage comprising a bar, a chuck supporting the bar and actuable for mounting on the part and securing the bar in alignment with the part, a support mountable with its centerline coinciding with the centerline of the article, a carriage movable in a guided path on the support relative to the bar, an arm supported by the carriage, movable therewith in the guided path and having a gaging surface, lying in a plane parallel with the said given radial line, to engage the bar, and means cooperating with the gaging surface and the bar to indicate whether or not the part is within predetermined limits of the said given radial line.

3. A gage for checking the position of a part, mounted on the inner periphery of a cylindrical article, with respect to a given line radially of the centerline of the article, the gage comprising a bar, a chuck supporting the bar and actuable for mounting on the part and securing the bar in alignment with the part, a support mountable with its centerline coinciding with the centerline of the article, a carriage movable in a guided path on the support relative to the bar, an arm supported by the carriage, movable therewith in the guided path and having a gaging surface, lying in a plane parallel with the said given radial line, to engage the bar, means cooperating with the gaging surface and the bar to indicate whether or not the part is within predetermined limits of the said given radial line in one direction, and spaced gaging members carried by the arm and extending at like angles from the gaging surface to receive the bar therebetween if the part is within predetermined limits of the said given radial line in another direction.

4. A gage for checking the positions of parts, mounted at spaced positions on the inner periphery of a cylindrical article, with respect to given lines radially of the centerline of the article and a reference plane parallel with the radial lines, the gage comprising, bars, individual chucks supporting the bars actuable for mounting on the parts and for securing the bars in alignment with their parts, a shaft mountable with its axis coinciding with the axis of the article, a carriage movable in a guided path on the shaft, and an arm supported by the carriage and having spaced sets of gaging members movable axially of the shaft and the article into engagement with the bars to gage whether or not the parts are within predetermined limits of the said given radial lines and the reference plane.

EARL C. MOSS.

REFERENCES CITED

The following references are of record in the file of this patent:

UNITED STATES PATENTS

| Number | Name | Date |
|---|---|---|
| 1,696,525 | Coolidge | Dec. 25, 1928 |
| 1,786,638 | Wadell | Dec. 30, 1930 |
| 2,431,100 | Woods | Nov. 18, 1947 |

FOREIGN PATENTS

| Number | Country | Date |
|---|---|---|
| 144,466 | Great Britain | June 17, 1920 |